(12) United States Patent
Ogasawara et al.

(10) Patent No.: US 10,673,049 B2
(45) Date of Patent: Jun. 2, 2020

(54) BUS BAR MODULE AND POWER SUPPLY DEVICE

(71) Applicant: Yazaki Corporation, Tokyo (JP)

(72) Inventors: Shigeyuki Ogasawara, Kakegawa (JP); Shinichi Yanagihara, Kakegawa (JP)

(73) Assignee: Yazaki Corporation, Tokyo (JP)

(*) Notice: Subject to any disclaimer, the term of this patent is extended or adjusted under 35 U.S.C. 154(b) by 712 days.

(21) Appl. No.: 14/941,718

(22) Filed: Nov. 16, 2015

(65) Prior Publication Data
US 2016/0072113 A1    Mar. 10, 2016

Related U.S. Application Data

(63) Continuation of application No. PCT/JP2014/063651, filed on May 23, 2014.

(30) Foreign Application Priority Data

May 27, 2013  (JP) .................................. 2013-110826

(51) Int. Cl.
   H01M 2/20   (2006.01)
   H01M 2/26   (2006.01)
   (Continued)

(52) U.S. Cl.
   CPC ......... H01M 2/202 (2013.01); H01M 2/1077 (2013.01); H01M 2/204 (2013.01);
   (Continued)

(58) Field of Classification Search
   CPC ........ H01M 2/20; H01M 2/202; H01M 2/204; H01M 2/206; H01M 10/48; H01M 10/482
   (Continued)

(56) References Cited

U.S. PATENT DOCUMENTS 6,152,776 A    11/2000   Ikeda et al.
6,346,011 B1    2/2002   Ikeda
              (Continued)

FOREIGN PATENT DOCUMENTS

JP        2011-091003 A      5/2011
JP     WO 2012/169373   * 12/2012   .............. H01M 2/20
              (Continued)

OTHER PUBLICATIONS

English translation of JP 2011-091003A obtained from AIPN (Year: 2011).*

(Continued)

*Primary Examiner* — Yoshitoshi Takeuchi
(74) *Attorney, Agent, or Firm* — Locke Lord LLP

(57) ABSTRACT

Provided is a bus bar module and a power supply device capable of reducing the entire size thereof and improving assemblability thereof. A barrel portion of a voltage detection terminal extends from a voltage detection line housing groove provided between batteries and is connected to an outer end portion of a terminal portion in a Y direction through a connection portion, so that it is possible to ensure a Y direction dimension of the barrel portion while reducing a Y direction dimension of the entire bus bar module and power supply device. This can prevent the voltage detection terminal from being bent in an X direction when being bent in the Y direction when being housed in a bus bar housing portion, thereby allowing improvement of assemblability.

4 Claims, 4 Drawing Sheets

(51) Int. Cl.
*H01M 10/48* (2006.01)
*H01M 2/10* (2006.01)

(52) U.S. Cl.
CPC ........... *H01M 2/206* (2013.01); *H01M 10/48* (2013.01); *H01M 10/482* (2013.01)

(58) Field of Classification Search
USPC .......................................................... 429/90
See application file for complete search history.

(56) References Cited

U.S. PATENT DOCUMENTS

| | | |
|---|---|---|
| 2002/0086578 A1 | 7/2002 | Ikeda |
| 2002/0098734 A1 | 7/2002 | Ikeda |
| 2004/0043663 A1 | 3/2004 | Ikeda et al. |
| 2011/0064987 A1 | 3/2011 | Ogasawara et al. |
| 2012/0306474 A1* | 12/2012 | Ikeda .................. H01M 2/1077 324/72 |
| 2014/0065885 A1* | 3/2014 | Nakayama ............ H01M 2/206 439/627 |
| 2014/0315441 A1* | 10/2014 | Kinoshita ........... H01M 2/1077 439/627 |

FOREIGN PATENT DOCUMENTS

| | | | |
|---|---|---|---|
| JP | 2013-033707 A | 2/2013 | |
| WO | WO-2012036317 A1 * | 3/2012 | .......... H01M 2/1077 |
| WO | WO-2013/005557 A1 | 1/2013 | |
| WO | WO-2013/069525 A1 | 5/2013 | |

OTHER PUBLICATIONS

International Search Report dated Jul. 22, 2014, issued for PCT/JP2014/063651.

* cited by examiner

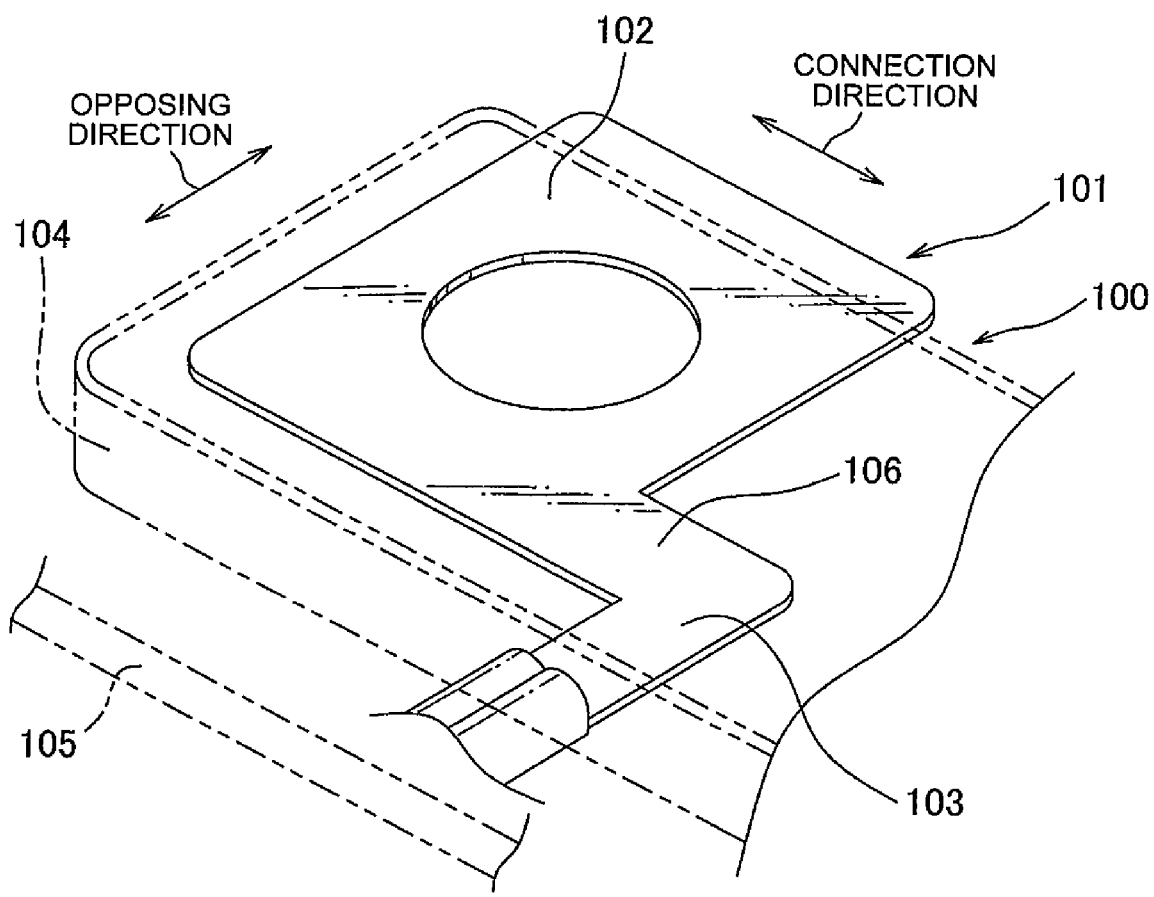

BUS BAR MODULE AND POWER SUPPLY DEVICE

TECHNICAL FIELD

The present invention relates to a bus bar module provided with a voltage detection terminal and a power supply device including the bus bar module.

BACKGROUND ART

Conventionally, there is proposed, as a bus bar module provided with a voltage detection terminal, a bus bar module in which the voltage detection terminal is connected to a wire routing portion through a barrel portion provided between adjacent batteries (e.g., refer to Patent Literature 1). In the bus bar module described in Patent Literature 1, arrangement of the barrel portion between the batteries prevents interference between the voltage detection terminal and other components.

CITATION LIST

Patent Literature

Patent Literature 1: JP 2013-33707 A

SUMMARY OF INVENTION

Technical Problem

However, as illustrated in FIG. 5, in the bus bar module described in Patent Literature 1, a voltage detection terminal 101 has a terminal portion 102 to be electrically connected to a battery electrode and a barrel portion 103, and the terminal portion 102 and barrel portion 103 are arranged in parallel in a direction in which batteries are connected to a bus bar. Thus, when, in order to house the voltage detection terminal 101 in a bus bar housing portion 104, a force is applied to the terminal portion 102 so as to bend the entire voltage detection terminal 101 in an opposing direction between the bus bar housing portion 104 and a wire routing portion 105, a portion around a boundary portion 106 between the terminal portion 102 and the barrel portion 103 is bent also in the connection direction. This makes it difficult to house the voltage detection terminal 101 in the bus bar housing portion 104, degrading assemblability of the bus bar module 100. Although a configuration in which the barrel portion 103 is made longer in the opposing direction so as to eliminate the bending around the boundary portion 106 in the connection direction can be considered, a dimension of the entire bus bar module may be disadvantageously increased in such a configuration.

An object of the present invention is to provide a bus bar module and a power supply device capable of reducing the entire size thereof and improving assemblability thereof.

Solution to Problem

A bus bar module in the present invention includes: a bus bar that connects electrodes of adjacent ones of a plurality batteries; a casing body that includes a plurality of bus bar housing portions each housing the bus bar and arranged in a connection direction of the bus bars; and a voltage detection terminal that is housed in the bus bar housing portion and detects a voltage of the electrode connected thereto, and the casing body includes: a wire routing portion that is separated from the bus bar housing portion in a direction crossing the connection direction and extends in the connection direction; and a wire housing portion that makes the bus bar housing portion and wire routing portion communicate with each other between the adjacent batteries and houses a voltage detection line connected to the voltage detection terminal, and the voltage detection terminal includes: a terminal portion that is housed in the bus bar housing portion so as to correspond to one of the adjacent batteries; a barrel portion that is connected to the voltage detection line; and a connection portion that connects an end portion of the terminal portion on an opposite side to the wire housing portion in an opposing direction between the bus bar housing portion and the wire routing portion and the barrel portion.

According to the present invention as described above, the barrel portion is disposed in the wire housing portion provided between the adjacent batteries, it is possible to reduce a dimension between the bus bar housing portion and wire routing portion while ensuring a length of the barrel portion, thereby allowing miniaturization of the entire bus bar module. Furthermore, the end portion of the terminal portion on the opposite side to the wire housing portion in the opposing direction and connection portion are connected, so that it is possible to ensure dimensions of the barrel portion and the connection portion in the opposing direction. This makes it easy to bend the voltage detection terminal in the opposing direction when being housed in the bus bar housing portion, thereby preventing the entire voltage detection terminal from being bent in the connection direction, which can improve assemblability.

In this case, in the bus bar module of the present invention, it is preferable that the barrel portion and the connection portion are provided so as to extend inclined to the opposing direction and the connection direction. With the configuration as described above, the barrel portion and the connection portion extend while being inclined, so that it is possible to reduce a total length of the connection portion and barrel portion in the connection direction as compared to a configuration in which the connection portion extends in the connection direction, thereby allowing a dimension of the entire bus bar module in the connection direction to be reduced.

Furthermore, in the bus bar module of the present invention, it is preferable that the connection portion is connected to the end portion of the terminal portion in the connection direction, the voltage detection terminal is provided at an end portion of the terminal portion on at least one side in the opposing direction and has a locking piece for fixation of the voltage detection terminal to the bus bar housing portion, and the bus bar housing portion has a locking receiving portion for locking the locking piece. With the configuration as described above, the terminal portion is connected to the connection portion at its connection direction end portion and has locking portions at its opposing direction end portions, so that it is possible to fix the voltage detection terminal to the bus bar housing portion while preventing interference between the connection portion and the locking portions.

A power supply device of the present invention includes the bus bar module, and a plurality of batteries.

According to the present invention as described above, the assemblability of the bus bar module can be improved as described above, and the opposing direction dimension of the bus bar module can be reduced, that is, the opposing direction dimension of the power supply device can be reduced to achieve miniaturization.

Advantageous Effects of Invention

According to the thus configured bus bar module and power supply device of the present invention, the barrel portion is disposed in the wire housing portion provided between the batteries and is connected, through the connection portion, to the end portion of the terminal portion on the opposite side to the wire housing portion in the opposing direction, so that it is possible to achieve miniaturization and to improve assemblability.

BRIEF DESCRIPTION OF DRAWINGS

FIG. 5 is a perspective view illustrating the voltage detection terminal provided in a conventional power supply device.

DESCRIPTION OF EMBODIMENTS

Figure 1:
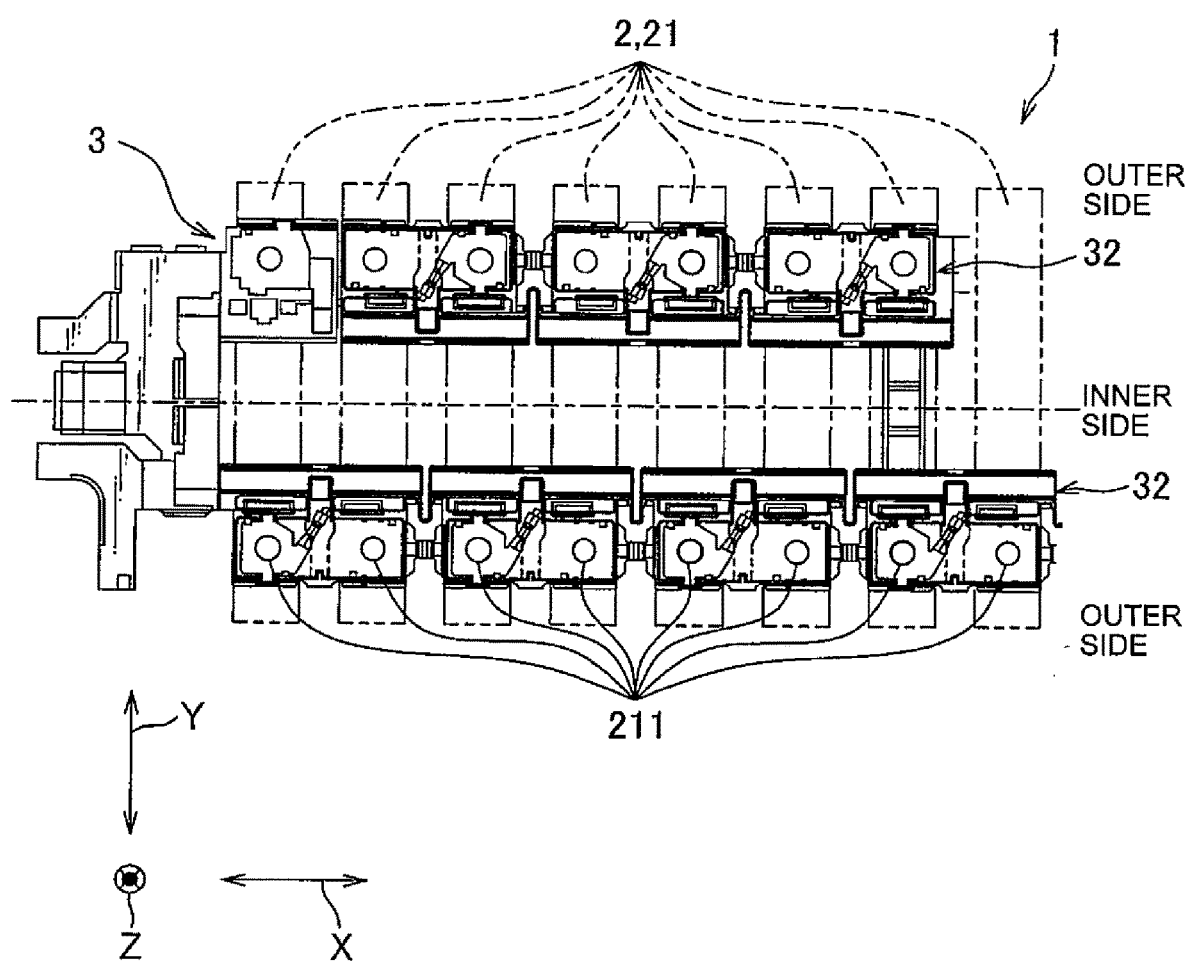
FIG. 1 is a top view illustrating a power supply device according to an embodiment of the present invention.

Hereinafter, an embodiment of the present invention will be described based on the drawings. As illustrated in FIG. 1, a power supply device 1 of the present embodiment includes a battery group 2 in which a plurality of batteries 21 are arranged in one direction and a bus bar module 3 that electrically connects the plurality of batteries 21. For example, the power supply device 1 is mounted on an electric car and used as a power supply for driving the car and operating electric components. In the present embodiment, an X direction, a Y direction, and a Z direction are defined as illustrated in FIG. 1. Furthermore, a near side of the paper surface of FIG. 1 is defined as a Z direction upper side, and a far side thereof is as a Z direction lower side. Furthermore, as illustrated in FIG. 1, a substantially center portion side of the battery 21 in the Y direction is defined as an inner side, and both end sides of the battery 21 in the Y direction are each defined as an outer side (that is, in FIG. 1, at an area above the substantially center portion of the battery 21 in the Y direction, an upper side is defined as the outer side, and a lower side is defined as the inner side; on the other hand, at an area below the substantially center portion of the battery 21 in the Y direction, an upper side is defined as the inner side, and a lower side is defined as the outer side).

The plurality of batteries 21 are arranged in the X direction. Two electrodes 211 are provided near both end sides of each battery 21 in the Y direction so as to protrude upward in the Z direction. The electrodes 211 corresponding to respective batteries 21 disposed adjacent in the X direction have different polarities from each other and electrically connected to each other by the bus bar module 3 as described later.

Figure 2:
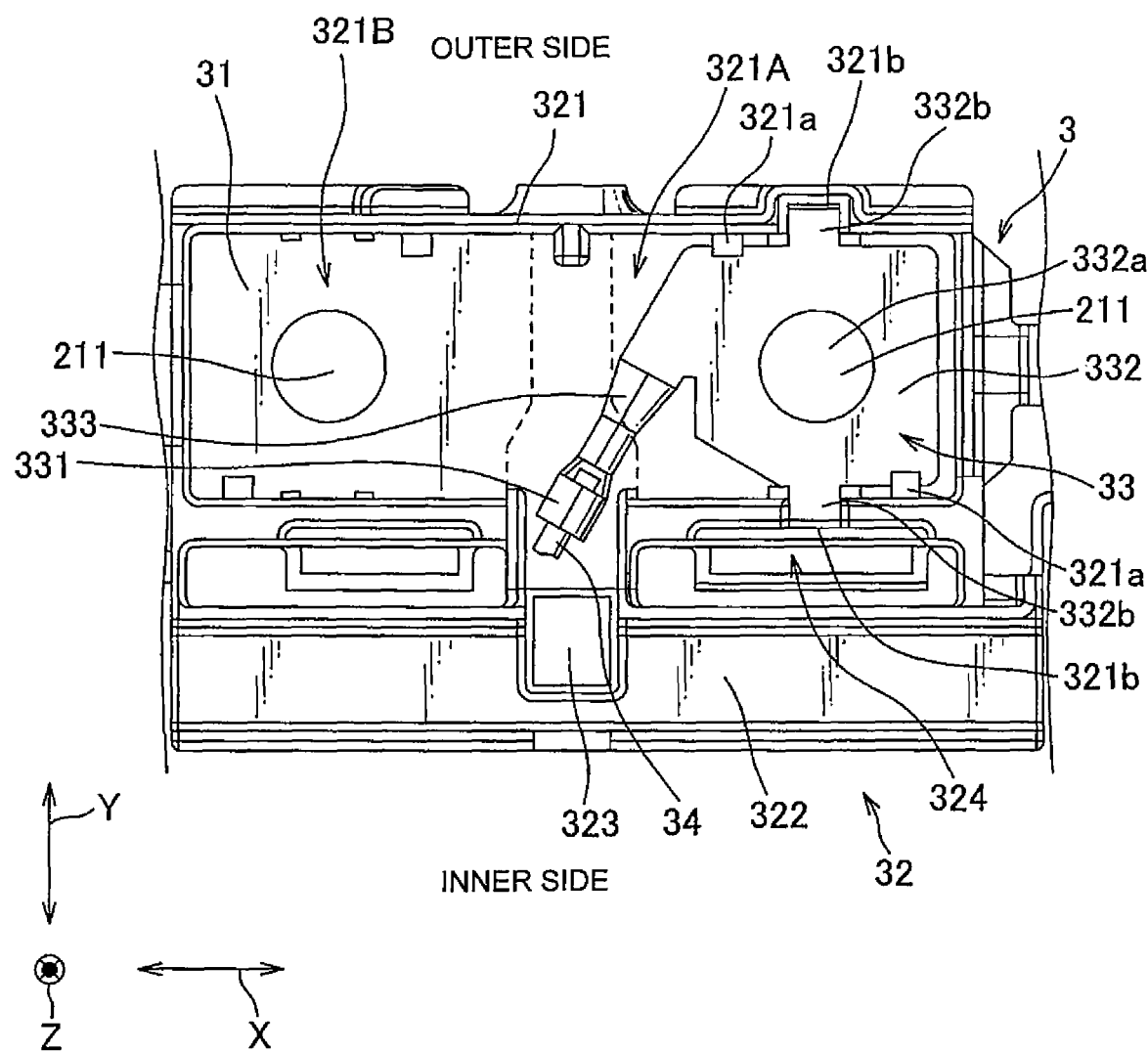
FIG. 2 is a top view illustrating, in an enlarged manner, a main part of the power supply device.

As illustrated in FIG. 2 in an enlarged manner, the bus bar module 3 includes a plurality of bus bars 31 each connecting the electrodes 211 of the two adjacent batteries 21, an insulating resin casing body 32 in which a plurality of bus bar housing portions 321 each housing the bus bar 31 are arranged, and a voltage detection terminal 33 that is housed in the bus bar housing portion 321 and detects a voltage of one of the electrically-connected electrodes 211. The bus bar 31 connects the electrodes 211 of the adjacent batteries 21 with the X direction as a connection direction.

The bus bar 31 is formed of a conductive metal. The bus bar 31 contacts, from above in the Z direction, the two electrodes 211 disposed adjacent in the X direction to electrically connect the two electrodes 211. For example, the bus bar 31 and electrode 211 are connected as follows. The electrode 211 is formed into a screw, and an insertion hole for receiving insertion of the electrode 211 is formed in the bus bar 31. Then, the electrode 211 is inserted through the insertion hole of the bus bar 31 and fixed by a nut.

The casing body 32 includes the bus bar housing portions 321 arranged in two rows in the X direction, a wire routing portion 322 extending in the X direction at the inner side than the bus bar housing portion 321 in the Y direction, and a voltage detection line housing groove 323 extending in the Y direction and serving as a wire housing portion making the wire routing portion 322 and bus bar housing portion 321 communicate with each other. The wire routing portion 322 and bus bar housing portion 321 are arranged opposite to each other in the Y direction.

The bus bar housing portion 321 surrounds X and Y direction peripheries of the bus bar 31 to thereby insulate the bus bar 31 from other bus bars 31. The bus bar housing portion 321 includes a first housing portion 321A provided on one electrode 211 and housing the voltage detection terminal 33 and a second housing portion 321B provided on the other electrode 211. The voltage detection line housing groove 323 is connected between the first and second housing portions 321A and 321B. There are formed, on both sides of the first housing portion 321A in the Y direction, protruding pieces 321a for fixing the voltage detection terminal 33 and locking receiving portions 321b for locking locking pieces 332b to be described later which are formed in the voltage detection terminal 33.

The casing body 32 has, at the inner side than the bus bar housing portion 321 in the Y direction, that is, between the bus bar housing portion 321 and wire routing portion 322, a locking groove 324 for locking a not illustrated cover portion for covering the bus bar housing portion 321 from above in the Z direction.

The wire routing portion 322 houses a not illustrated wire electrically connected to each bus bar 31 and a voltage detection line 34 electrically connected to the voltage detection terminal 33. The voltage detection line 34 passes through the voltage detection line housing groove 323 to be connected to the voltage detection terminal 33.

Figure 3:
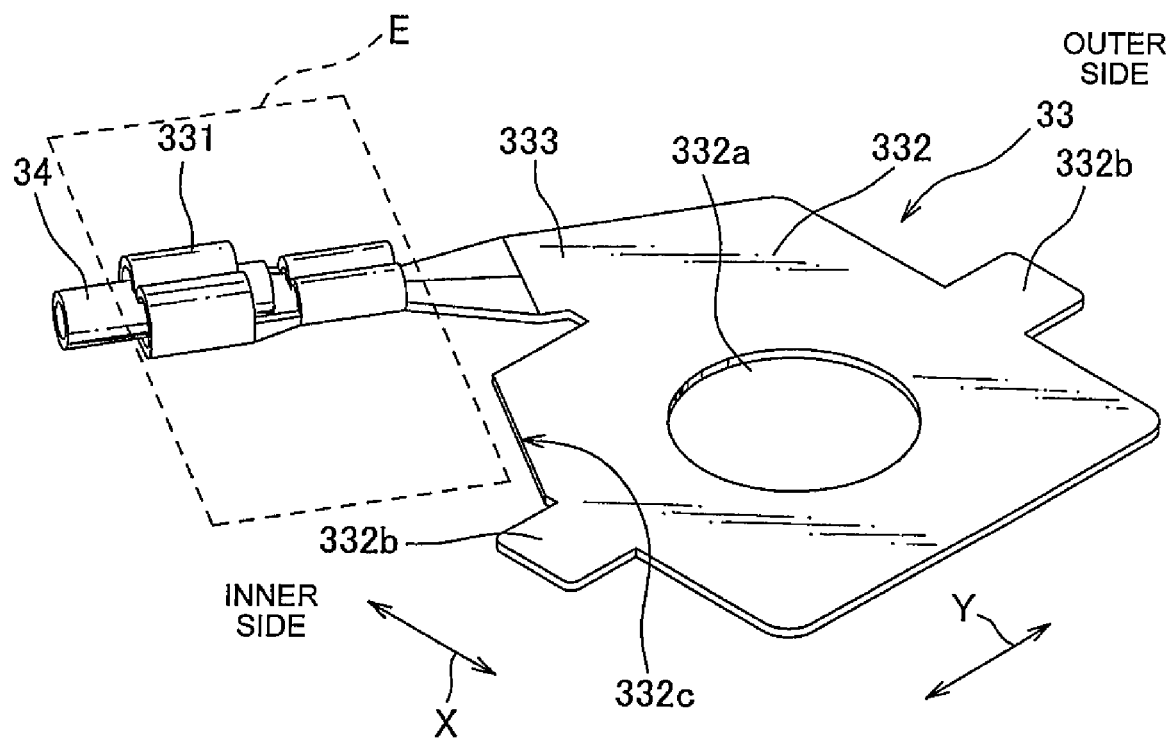
FIG. 3 is a perspective view illustrating a voltage detection terminal provided in the power supply device.

As illustrated in FIG. 3, the voltage detection terminal 33 includes a barrel portion 331 to be connected to the voltage detection line 34, a terminal portion 332 housed in the first housing portion 321A and to be electrically connected to the electrode 211 through the bus bar 31, and a connection portion 333 connecting the barrel portion 331 and terminal portion 332. The voltage detection terminal 33 is integrally formed of a plate-like metal member.

The barrel portion 331 is connected to the voltage detection line 34 in the voltage detection line housing groove 323 and extends inclined to the Y and X directions so as to approach the terminal portion 332 as it goes from the inner side to outer side in the Y direction. The connection portion 333 extends continuously from the barrel portion 331 in substantially the same direction as the barrel portion 331 and is connected to a Y direction outer end portion of the terminal portion 332. The connection portion 333 is connected to an X direction end portion of the terminal portion 332 on a side at which batteries 21 are connected.

The terminal portion 332 has, at its substantially the center portion, an insertion hole 332a through which the electrode 211 is inserted and has locking pieces 332b protruding in the Y direction at the Y direction both end portions, respectively. Furthermore, the terminal portion 332 has a cut 332c so as to ensure a space E for caulking the voltage detection line 34 and barrel portion 331 using a not illustrated applicator.

The following describes an assembly method of the bus bar module 3, through which the voltage detection terminal 33 is housed in the bus bar housing portion 321. The voltage detection terminal 33 is connected to the voltage detection line 34, and the barrel portion 331 is housed in the voltage detection line housing groove 323. Then, while the Y direction inner side locking piece 332b of the terminal portion 332 is engaged with the locking receiving portions 321b, the Y direction inner side end portion of the terminal portion 332 is disposed below the protruding pieces 321a in the Z direction. Furthermore, the terminal portion 332 is operated to bend the entire voltage detection terminal 33 to the Y direction (such that the voltage detection terminal 33 protrudes downward in the Z direction as viewed in the X direction), and the Y direction outer side end portion of the terminal portion 332 is brought close to the bus bar housing portion 321 while the electrode 211 is inserted through the insertion hole 332a. Then, while the Y direction outer side locking piece 332b of the terminal portion 332 is engaged with the locking receiving portions 321b, the Y direction outer side end portion of the terminal portion 332 is disposed below the protruding pieces 321a in the Z direction. With the above procedure, the assembly is completed.

According to the above-described embodiment, the following effects can be obtained. The barrel portion 331 is connected to the Y direction outer side end portion of the terminal portion 332 through the connection portion 333, so that it is possible to increase a Y direction dimension of the barrel portion 331 and that of the connection portion 333. This prevents the barrel portion 331 and the connection portion 333 from being bent in the X direction when the entire voltage detection terminal 33 is bent in the Y direction, thereby allowing improvement of assemblability upon housing of the voltage detection terminal 33 in the bus bar housing portion 321.

Furthermore, the voltage detection line housing groove 323 is disposed between the first and second housing portions 321A and 321B, so that it is possible to reduce the Y direction dimension between the bus bar housing portion 321 and wire routing portion 322 while ensuring the Y direction dimension of the barrel portion 331. This can reduce the Y direction dimension of the entire bus bar module 3 and, eventually, the Y dimension direction of the entire power supply device 1, thereby achieving miniaturization.

Furthermore, the barrel portion 331 and connection portion 333 extend in substantially the same direction, so that it is possible to simplify the configuration. Furthermore, the barrel portion 331 and connection portion 333 extend inclined to the Y and X directions, so that it is possible to reduce an X direction dimension of the voltage detection line housing groove 323 while ensuring a total length dimension of the barrel portion 331 and connection portion 333. This can reduce an interval between the batteries 21 and, eventually, the X direction dimension of the power supply device 1, thereby achieving miniaturization.

Furthermore, the terminal portion 332 is connected to the connection portion 333 at its X direction end portion and fixed, at its Y direction end portions, to the bus bar housing portion 321 by the locking pieces 332b, locking receiving portions 321b, and protruding pieces 321a, so that it is possible to prevent the connection portion 333 from interfering with the locking piece 332b and protruding pieces 321a. This allows effective use of space.

Furthermore, the locking groove 324 for locking the cover portion is formed between the bus bar housing portion 321 and wire routing portion 322, so that even when the Y direction dimension of the voltage detection line housing groove 323 is increased so as to ensure the Y direction dimension of the barrel portion 331, it is possible to effectively use a space between the casing body 32 and wire routing portion 322.

Figure 4:
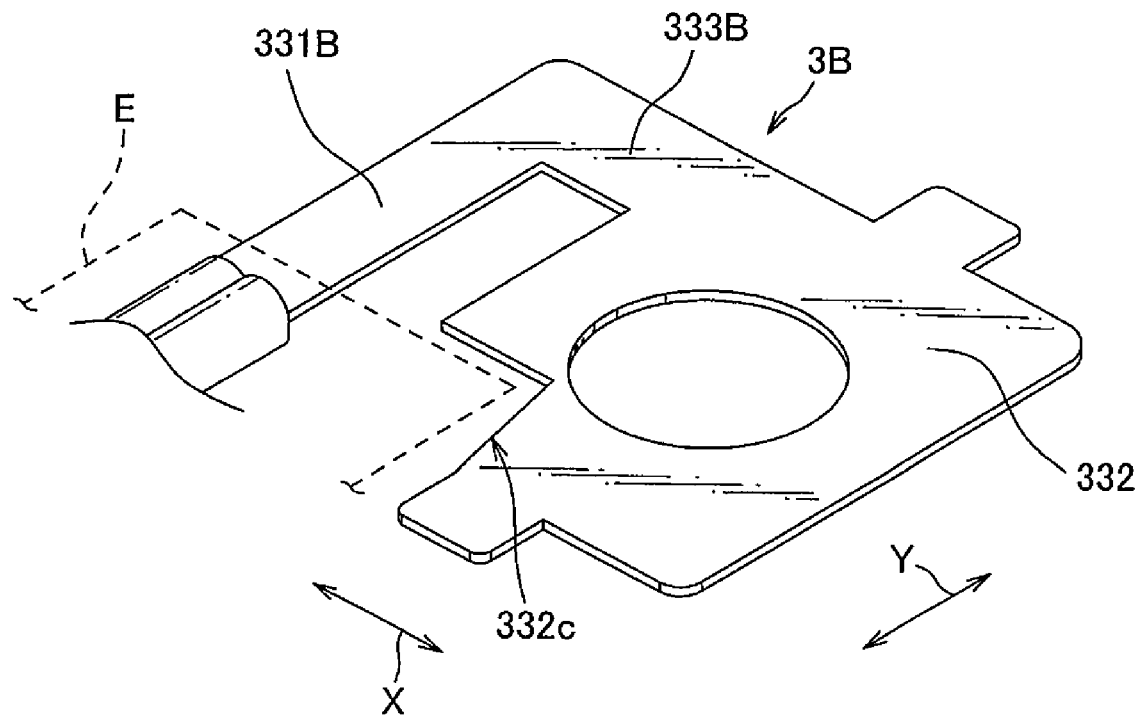
FIG. 4 is a perspective view illustrating the voltage detection terminal provided in a power supply device according to a modification of the present invention.

The present invention is not limited to the above embodiment but includes other configurations to achieve an object of the present invention, and includes modifications as well, as mentioned below. For example, in the above embodiment, the barrel portion 331 and connection portion 333 extend inclined to the Y and X directions; however, as illustrated in FIG. 4, a configuration may be adopted, in which a barrel portion 331B and a connection portion 333B of a voltage detection terminal 3B extend in the Y direction and X direction, respectively. With this configuration, it is possible to further increase the Y direction dimension of the barrel portion 331, thereby allowing improvement of the assemblability.

Furthermore, in the above embodiment, the terminal portion 332 has the locking pieces 332b, and the bus bar housing portion 321 has the locking receiving portions 321b and protruding pieces 321a; however, the locking pieces 332b, locking receiving portions 321b, and protruding pieces 321a may be omitted. In this case, a configuration may be adopted, in which the electrode 211 formed into a screw is inserted through an insertion hole of the bus bar 31 and insertion hole 332a of the terminal portion 332 and fixed by a nut.

Furthermore, in the above embodiment, the power supply device 1 includes the battery group 2 arranged in a row and bus bar module 3 connecting the battery group 2; however, the power supply device may have a configuration in which a plurality of the battery groups 2 each arranged in a row are connected in series or parallel by the bus bar modules. With such a configuration, it is possible to arbitrarily set the voltage and capacity of the power supply device.

Furthermore, in the above embodiment, the wire routing portion 322 is disposed at the inner side than the bus bar housing portion 321 in the Y direction; however, the wire routing portion may be disposed at the outer side than the bus bar housing portion. That is, the wire routing portion may be disposed at an adequate position in accordance with a shape of the battery 21 and a connection state of the wire.

While the preferred configuration, method, and the like for carrying out the present invention are disclosed in the above descriptions, the present invention is not limited to this. That is, while the present invention has been illustrated and described in conjunction of a specific preferred embodiment thereof, it is to be understood that numerous changes and modifications may be made to the shape, material, number, and other detailed configurations described in the above embodiment by those skilled in the art without departing from the spirit and scope of the present invention. Therefore, the descriptions disclosed in the above that limit the shape, material, and the like are examples for making the present invention easier to understand and do not limit the present invention. Accordingly, descriptions made with names of the components in which a part of or all of the limitations such as the shape, material and the like have been released can be regarded as the present invention.

REFERENCE SIGNS LIST

1 Power supply device
21 Battery
3 Bus bar module
31 Bus bar
32 Casing body
33 voltage detection terminal
34 voltage detection line
321 Bus bar housing portion
321b Locking receiving portion
322 Wire routing portion
323 Voltage detection line housing groove (wire housing portion)
331 Barrel portion
332 Terminal portion
333 Connection portion
332b Locking piece

The invention claimed is:

1. A bus bar module comprising:
a bus bar that connects electrodes of adjacent batteries;
a casing body that includes a plurality of bus bar housing portions, each casing body housing the bus bar and arranged in a connection direction of the bus bar; and
a voltage detection terminal that is housed in one of the plurality of the bus bar housing portions of the casing body and detects a voltage of the electrode connected thereto,
wherein
the casing body includes:
a wire routing portion that is separated from the plurality of bus bar housing portions in a direction crossing the connection direction and extends in the connection direction; and
a wire housing portion that makes the plurality of bus bar housing portions and wire routing portion communicate with each other between the adjacent batteries and houses a voltage detection line connected to the voltage detection terminal,
the voltage detection terminal includes:
a terminal portion having as an outline thereof a pair of sides orthogonal to each other that is housed in one of the plurality of the bus bar housing portions corresponding to one of the adjacent batteries;
a barrel portion that is connected to the voltage detection line; and
a connection portion that connects an end portion of the terminal portion, on an opposite side to the wire housing portion in an opposing direction between the plurality of bus bar housing portions and the wire routing portion, and the barrel portion, the barrel portion and the connection portion extending at an incline to the pair of sides orthogonal to each other of the terminal portion, and
wherein the terminal portion is housed in the one of the plurality of bus bar housing portions with the pair of sides orthogonal to each other aligned in the opposing direction and the connection direction.

2. The bus bar module according to claim 1, wherein
the connection portion is connected to the end portion of the terminal portion in the connection direction,
the voltage detection terminal is provided with a locking piece for fixation of the voltage detection terminal to the bus bar housing portion on at least one of the end portion and another end portion opposite thereto in the opposing direction of the terminal portion, and
the bus bar housing portion has a locking receiving portion for locking the locking piece.

3. A power supply device comprising:
the bus bar module according to claim 1; and
a plurality of batteries.

4. A power supply device comprising:
the bus bar module according to claim 2; and
a plurality of batteries.

* * * * *